United States Patent Office 3,770,670
Patented Nov. 6, 1973

3,770,670
PROCESS FOR THE PRODUCTION OF OPEN-CELL SOFT FOAM MATERIALS FROM VINYL CHLORIDE POLYMER PLASTISOL

Burkhard Kuhlow, Gelsenkirchen, Arnold Polte, Recklinghause, and Alfred Michels, Marl, Germany, assignors to Chemische Werke Huls Aktiengesellschaft, Marl, Germany
No Drawing. Filed May 26, 1972, Ser. No. 257,246
Claims priority, application Germany, May 29, 1971,
P 21 26 951.2
Int. Cl. C08j 1/16
U.S. Cl. 260—2.5 P        5 Claims

ABSTRACT OF THE DISCLOSURE

In a process of making a plasticized vinyl resin open-cell sponge which comprises mechanically frothing a plastisol comprising 100 parts by weight of a particulate thermoplastic vinyl resin selected from the group consisting of polyvinylchloride and copolymers of vinylchloride, and from 50–200 parts of high boiling organic liquid plasticizer for the resin and thereby incorporating a surrounding gas into the mixture, subsequently heating the resulting froth at a temperature and for a time sufficient to fuse the resin particles with the plasicizer while maintaining the froth structure, and cooling the resulting material to room temperature, the improvement comprising adding about 0.5 to 2.5 percent by weight based on the vinyl resin of an emulsifier mixture to the plastisol during the mechanical frothing, said emulsifier mixture comprising:

(a) about 30–80 percent by weight of the calcium salt of n-dodecylbenzenesulfonic acid; and
(b) about 70–20 percent by weight of a compound having the general formula

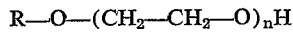

R—O—(CH$_2$—CH$_2$—O)$_n$H wherein R represents an unbranched alkyl group having 8–20 carbon atoms, and $n$ represents integers from 6–16.

CROSS REFERENCE TO A RELATED APPLICATION

Applicants incorporate by reference the disclosure of U.S. patent application Ser. No. 257,245 of Wolfgang Jurgeleit and Hermann Winter, entitled "Polyvinylchloride Resin Powders" filed May 26, 1972.

BACKGROUND OF THE INVENTION

The field of the invention is the pore-forming of synthetic resins. The invention is particularly related to a process for producing open-cell soft foam materials from plastisols containing polyvinylchloride or vinylchloride copolymers by the addition of an emulsifier mixture and the mechanical dispersion of gas therein.

The state of the art of polyvinylchloride may be ascertained by reference to the Kirk-Othmer "Encyclopedia of Chemical Technology," 2nd ed., vol. 21 (1970), pages 369–412, particularly pages 403 and 404 wherein plastisols and open-cell sponge materials made therefrom are disclosed and Kirk-Othmer ibid, vol. 9 (1966), pages 853 and 856 wherein the preparation of polyvinylchloride foam is disclosed by the fusion of a dispersion of plastisol resin and a plasticizer.

The present invention is a particular improvement over the process disclosed in U.S. Pat. 2,861,963 of Butsch, the disclosure of which is incorporated herein.

It is conventional to produce soft PVC foam materials from polyvinylchloride plastisols by the addition of chemical blowing agents which decompose at an elevated temperature with gas evolution. Suitable chemical blowing agents for this application are organic azo, hydrazo, nitroso, and azide compounds, as disclosed in "Kunststoffe" 45/1957, pp. 446–455; "Kunststoffe" 47/1959, pp. 383–390; and "Kunststoffe" 52/1962, pp. 624–629.

Furthermore, the production of soft PVC foam materials by dispersing gas in plastisols under pressure is likewise known. Among these processes are the "Elastomer," "Dennis," and "Trovipor" processes as disclosed by Krekeler and G. Wick, in the "Kunststoffe-Handbuch," vol. II, part 1, pp. 569–579, Munich 1963; U.S. Pat. 2,917,473 of Smythe et al. which issued Dec. 15, 1959; U.S. Pat. 2,763,475 of Dennis which issued Sept. 18, 1956; German Pat. 1,141,440; German Pat. 1,112,627; and O. Fuchs, F. Heckelt, and A. Hertz in "Kunststoffe," vol. 55, 1965, pp. 717–723. Furthermore, processes are known for the manufacture of foams by beating air into a plastisol with the use of emulsifiers as disclosed in German published applications DAS 1,254,863 and DAS 1,282,928; and "Kunststoffe" 57/1967, pp. 25–31.

The use of chemical blowing agents has several disadvantages. On the one hand, suitable propellant materials are expensive and, on the other hand, the processes can be controlled only with great difficulty. Besides, high gelling temperatures are required, and predominantly closed-cell foam materials are obtained.

The main disadvantage exhibited by the gas pressure processes as disclosed in U.S. Pat. 2,917,473 resides in that expensive apparatus is necessary for carrying it out. Furthermore, this process is unsuitable for the direct coating of textiles, since layer thicknesses of 0.5–1.5 mm. can be maintained only with difficulty. These thicknesses are frequently needed, for example, for intermediate layers for PVC foam artificial leather materials, as well as for backings for floor coverings or wall coverings. Finally, it is to be kept in mind that foam materials are obtained which have only a relatively coarse-pored structure. Such materials are quite undesirable for the manufacture of PVC foam synthetic leather materials and exhibit the further disadvantage that a thin, closed, and air-impermeable skin forms on the open-pore foam material during the gelling step in the hot air duct.

In the manufacture of foam by heating air into the composition, it has been difficult heretofore to produce foam materials having a uniform cell size, since the foamed plastisol tends to break down prior to or during the gelling step. A great number of attempts have been made to avoid these disadvantages. Thus, it is known, for example, from U.S. Pat. 2,861,963 of Butsch, which issued Nov. 25, 1958, to add to the plastisol prior to the beating step a nonionic surfactant, an alkali salt of a sulfonated fatty acid alcohol, and an alkali salt of ethylenediaminetetraacetic acid.

Furthermore, a process is known from U.S. Pat. 2,909,-493 of Bush, which issued Oct. 20, 1959, wherein the additives containing soap are added to the plastisol during or directly after the foam whipping step.

DAS 1,254,863 discloses adding the soap, which is optionally formed in situ, to the plasticizer before the production of the plastisol. Uniform, stable foams are produced. A disadvantage in these processes is that relatively large amounts of emulsifier must be used for obtaining low weights per unit volume. Besides, the large amount of fatty acids disclosed therein leads to troublesome concomitant phenomena in the finished foam material, such as, for example, a strongly rancid odor, reduction of the mechanical strength values, decreased light and thermal stabilities, as well as the bleeding out of colors.

SUMMARY OF THE INVENTION

Having in mind the limitations of the prior art, it has now been discovered that these advantages can be avoided in a process for the production of open-cell soft foam materials from plastisols containing polyvinylchloride or vinylchloride copolymers by the addition of an emulsifier mixture and the mechanical dispersion of gas, by providing that the emulsifier mixture added to the plastisols consists of:

(a) 30–80 percent by weight, preferably 55–65 percent by weight, of the calcium salt of n-dodecylbenzenesulfonic acid; and (b) 70–20 percent by weight, preferably 45–35 percent by weight, of a compound of the formula $$R-O-(CH_2-CH_2)-O)_nH$$

wherein

R represents an unbranched alkyl group of 8–20, preferably 12–18 carbon atoms, and n represents integers from 6 to 16, preferably 10 to 12.

The calcium salt of n-dodecylbenzenesulfonic acid is prepared by neutralizing n-dodecylbenzosulfonic acid with an equivalent amount of calcium hydroxide.

Examples of compounds of type (b) which can be employed are: polyoxyethylenes of octyl, decyl, lauryl, myristyl, cetyl, or stearyl alcohol, etc.

Advantageously, the oxyethylenes of readily obtainable, commercially available mixtures of such alcohols are also used, such as, for example, coconut oil alcohol.

The degree of oxyethylation is 6–16, preferably 10–12. The respective alcohols are reacted in the conventional manner with the respective molar number of ethylene oxide.

British Pat. 1,027,481 of Aalbers et al., published Apr. 27, 1966, discloses the preparation of compounds of the general formula $$R-O-(CH_2-CH_2-O)_nH$$

and gives specific examples of the reaction of ethylene oxide with lauryl alcohol, decyl alcohol and myristyl alcohol.

DESCRIPTION OF THE PREFERRED EMBODIMENTS

The emulsifier mixture is diluted by the addition of conventional solvents, especially water or alcohols. The solvent can be added in amounts of 1 to 5 percent by weight. The liquid emulsifier mixture is added to the plastisol, which has first been prepared prior to the whipping step, generally in amounts of about 0.5 to 2.5 percent by weight, and preferably in amounts of about 2.0 to 2.5 percent by weight, based on the amount of resin employed.

When the process is conducted continuously, a premix is first prepared from the emulsifier mixture and 10–15 parts by weight of plasticizer, based on 1 part by weight of the emulsifier mixture, before the emulsifier mixture is continuously added to the plastisol prior to the whipping step.

In addition to polyvinylchloride, it is possible to use as the polymers also those copolymers of polyvinylchloride which contain up to 10 percent of comonomer. As the comonomer, those disclosed in U.S. Pat. 2,861,963 are used. The use of vinyl acetate as the comonomer is preferred. Preferably, emulsion polymers are used.

For the preparation of the plastisol, high boiling organic liquid plasticizers are used, such as, for example, dioctyl phthalate, dinonyl phthalate, didecyl phthalate, butyldecyl phthalate, dicapryl phthalate, butylbenzyl phthalate, dioctyladipic acid esters, dioctylsebacic acid esters, tricresyl phosphate, trioctyl phosphate, cresyldiphenyl phosphate, alkylsulfonic acid esters of phenol and cresol plasticizers of the epoxy type, polymeric plasticizers, and acrylonitrile-butadiene copolymers. Generally, several of these plasticizers are used in combination, in the form of composite plastiticzer systems.

The polyvinylchloride plastisols, can if desired, contain various conventional additives. Ordinarly, heat stabilizers and light stabilizers are present, namely compounds of lead, tin, zinc, cadmium, or barium, or complexes thereof.

In order to reduce the cost of the finished foam and to modify the properties thereof, fillers are frequently added to the plastisol. Typical fillers are calcium carbonate and barium sulfates. When fillers are used in the plastisol, the former are generally present in an amount of up to 100 parts by weight of filler per 100 parts by weight of polyvinylchloride.

If a colored or tinted polyvinylchloride foam is desired, coloring agents or pigments are incorporated into the plastisol in a conventional manner.

The plastisols are prepared according to the usual paste-mixing methods as disclosed in "Gummi-Asbest-Kunststoffe," vol. 23/1970, p. 938.

The plastisol comprises per 100 parts by weight of particulate thermoplastic polyvinylchloride or vinylchloride copolymer generally 50 to 200 parts by weight and preferably 60 to 80 parts by weight of the high boiling organic liquid plastticizer.

The plastisol is mechanically beaten or whipped in order to disperse air therein by using a batch mixer, e.g. an eggbeater, or preferably with the use of a continuous mixer, e.g. Euromtic, Oakes, in order to form an open-cell foam structure as disclosed in "Kunststoffe" 57/1967, pp. 25–31.

The gelling step is carried out conventionally by heating to 120–170° C. with hot air, infrared, or high frequency. The heating temperature and time vary according to the components present in the plastisol and with the thickness of the foam. After the heating step, the homogenized foam is cooled to room temperature and this is done by air cooling or contact cooling by means of cooling rolls. The gelled open-cell sponge obtained by the process of the invention exhibits a density of about 0.6 to 0.45, preferably 0.5 to 0.45 gram per cubic centimeter.

Specific examples of the overall combination PVC resin, plasticizer and emulsifier mixture, in parts by weight, include:

60 parts PVC resin having K value of 70,
22.5 parts benzylbutyl phthalate and
17.5 parts dioctyl phthalate,
0.93 part of the calcium salt of dodecylbenzenesulfonic acid and
0.525 part of coconut oil alcohol etherified with 12 moles of ethylene oxide;
60 parts PVC resin having K value of 70,
40 parts of "Mesamoll,"
0.93 part of the calcium salt of dodecylbenzenesulfonic acid and
0.525 part of coconut oil alcohol etherified with 12 moles of ethylene oxide;
60 parts of vinylchloride copolymer with 5 percent of vinyl acetate having a K value of 70,
22.5 parts of benzlbutyl phthalate and
17.5 parts dioctyl phthalate,
0.93 part of the calcium salt of dodecylbenzenesulfonic acid and
0.525 part of coconut oil alcohol etherified with 12 moles of ethylene oxide;

Example 1

The following plasticizers were first thoroughly mixed together in a "Spangenberg" planetary mixer:

22.5 parts by weight of benzylbutyl phthalate
17.5 parts by weight of dioctyl phthalate To this plasticizer mixture was gradually added 60 parts by weight of a polyvinyl chloride resin having a K value of 70, and the components were mixed in the "Spangenberg" planetary mixer until the plastisol was homogeneous and free of lumps.

Various amounts of an emulsifier mixture having the composition set forth below were added respectively to 300 g. of this plastisol:

62 percent by weight of the calcium salt of dodecylbenzenesulfonic acid,
35 percent by weight of coconut oil alcohol, etherified with 12 moles of ethylene oxide.

This mixture was diluted with 3 percent by weight of water.

Subsequently, air was beaten into these 300 g. batches containing the varying amounts of emulsifier set forth in the table, by 10 minutes of agitation with an "AEG" Allgemeine Elektricitaets-Gesellschaft manual kitchen eggbeater. During this procedure, the emulsifier mixture added was simultaneously distributed in the plastisol. After the absorption of air had been terminated, the density of the foamed plastisols was determined. A sample was, in each case, spread in a thickness of 3 mm. on PVC release paper by means of a manual doctor blade and gelled at 170° C. after 2 minutes in a laboratory-type air circulation chamber manufactured by the firm Heraeus. Results were achieved as indicated in the following table:

TABLE

| Parts by weight: | | | | | | | | | |
|---|---|---|---|---|---|---|---|---|---|
| Polyvinylchloride, K value 70 | 60 | 60 | 60 | 60 | 60 | 60 | 60 | 60 | 60 |
| Benzylbutyl phthalate | 22.5 | 22.5 | 22.5 | 22.5 | 22.5 | 22.5 | 22.5 | 22.5 | 22.5 |
| Dioctyl phthalate | 17.5 | 17.5 | 17.5 | 17.5 | 17.5 | 17.5 | 17.5 | 17.5 | 17.5 |
| Emulsifier mixture (as described above) | 0.15 | 0.30 | 0.60 | 0.90 | 1.20 | 1.50 | 2.25 | 3.00 | |
| Density of non-gelled foam (g./cm.³) | 1.15 | 0.95 | 0.66 | 0.60 | 0.55 | 0.54 | 0.48 | 0.46 | 0.46 |
| Density of gelled foam (g./cm.³) | 1.15 | 0.93 | 0.62 | 0.56 | 0.50 | 0.50 | 0.45 | 0.43 | 0.42 |

It can be seen from the above table that by minor additions of the emulsifier mixture employed herein, new and unexpected densities are attained. In view of the small differences in density, an increase beyond 1.5 parts by weight of emulsifier mixture (=2.5 percent, based on PVC) is unnecessary.

Example 2

The same recipe was employed in preparing the paste batch as described in Example 1. However, the mixing device in this case was a high speed mixer of the "Dissolver" type manufactured by Spangenberg. After stirring the polyvinylchloride resin into the charge, 1.5 percent by weight (based on the proportion of PVC) of an emulsifier mixture was added, as set out in Example 1. This paste was foamed in a "Euromatic" continuous mixer. The following conditions were maintained:

Initial pressure: 10 atmospheres gauge
System pressure: 8 atmospheres gauge
Amount of air: 800 dial graduations
Pump pressure: 9 atmospheres gauge
Rotor speed: 170 r.p.m.
Hose length: 8 m.
Hose diameter: 32 mm.
Output: 1230 kg. of paste per hour
Density of non-gelled foam: 0.54 g./cm.³

The non-gelled foam was spread, with a doctor blade machine, onto PVC release paper and gelled in a tangentially ventilated 3-zone laboratory gelling channel having a length of 15 m. The hot air temperature in the channel was, increasing from zone 1 to zone 3, 135° C./160° C./172° C. and the spreading speed was 3 meters per minute, so that dwell times of 5 minutes were reached.

After the gelling procedure, the following values were determined for the foam:

Coating, g./m.² _____ 1080
Thickness, mm. _____ 2.35
Density, g./cm.³ _____ 0.46
Open cells, percent _____ 60
Closed cells, percent _____ 3

Example 3

With the use of a planet mixer, a plastisol was produced in the usual manner from 40 parts by weight of "Mesamoll" (a commercial plasticizer comprising a pentadecylsulfonic acid ester mixture of phenol and cresol of Farbenfabriken Bayer) and 60 parts by weight of a polyvinylchloride resin having a K value of 70.

To 300 g. of such a paste was added 1.5 percent by weight (based on polyvinylchloride) of the emulsifier mixture described in Example 1. Thereafter, the foaming process was carried out by agitation with an "AEG" kitchen eggbeater (10 minutes). After the absorption of air was terminated, a density of the non-gelled foam of 0.53 g./cm.³ was reached.

A sample of the foam was spread with a manual doctor blade to a thickness of 3 mm. on PVC paper and gelled at 170° C. for 2 minutes in a laboratory-type circulation air chamber manufactured by the firm Heraeus. After gelling, the density of the foam was 0.49 g./cm.³.

Example 4

A plastisol was formed by means of a high speed mixer from 45 parts by weight of benzylbutyl phthalate, 35 parts by weight of dioctyl phthalate, and 120 parts by weight of a vinylchloride copolymer (K value 70) with a vinyl acetate content of 5 percent. Into this plastisol 1.5 percent, based on the proportion of copolymer, of the emulsifier mixture set forth in Example 1 was mixed.

The foaming of this plastisol was effected in a "Euromatic" continuous mixer under the following conditions:

Initial pressure: 10 atmospheres gauge
System pressure: 2.1 atmospheres gauge
Amount of air: 70 dial graduations
Pump pressure: 2.6 atmospheres gauge
Rotor speed: 170 r.p.m.
Hose length: 8 m.
Hose diameter: 32 mm.
Efficiency (output): 100 kg./h.
Density of non-gelled foam: 0.53 g./cm.³

The foam was spread on as in Example 2 and gelled. The gelling temperatures were, from zone 1 to zone 3, 127° C./130° C./134° C., and the operating speed was 4 meters per minute (dwell time 3.7 minutes). After gelling, the foam density was 0.48 g./cm.³

Example 5

Into a high speed "Dissolver" type mixer manufactured by Spangenberg, the following plastisol was mixed:
120 parts by weight of polyvinylchloride resin, K value 70;
45 parts by weight of benzylbutyl phthalate;
35 parts by weight of dioctyl phthalate; and
40 parts by weight of chalk.

To this plastisol 1.5 percent by weight (based on the PVC) of the emulsifier mixture described in Example 1, was added and mixed therewith.

The foaming of this filler-containing plastisol was conducted by means of a "Euromatic" mixer under the usual conditions. The density of the non-gelled foam was 0.60 g./cm.³, and that of the gelled foam was 0.55 g./cm.³.

Example 6

By means of a high speed paste mixer, a storage-stable paste was produced from 120 parts by weight of polyvinylchloride, K value 70, and 70 parts by weight of a plasticizer mixture, consisting of 30 parts by weight of dioctyl phthalate and 40 parts by weight of benzylbutyl phthalate.

In a further procedure, a plasticizer-emulsifier mixture, consisting of 5 parts by weight of dioctyl phthalate, 5 parts by weight of benzylbutyl phthalate, and 2 parts by weight of the emulsifier mixture described in Example 1, was mixed by simple stirring.

The polyvinylchloride paste was fed, via pumps, to a continuously operating mixer for foaming. Directly prior to entrance of the paste into the mixer head, the plasticizer-emulsifier system was fed in metered amounts in a ratio of 1:15 to the paste via a pump. Foaming took place under the conditions described above.

In all examples, an emulsion polymer suitable for pastes was used.

The calcium salt of n-dodecylbenzenesulfonic acid is prepared by sulfonation of n-dodecylbenzene with oleum, as described in H. F. Fierz-David and I. Blangey, Grundlegende Operation der Farbenchemie, 8th ed., Vienna, 1952, page 79, with subsequent neutralization of the sulfonic acid thus formed by calcium hydroxide and a final removal of the precipitated calcium sulfate.

Example 7

Into a high speed "Dissolver" type mixer manufactured by Spangenberg, the following plastisol was mixed:

100 parts by weight of polyvinylchloride resin, K value 70;
55 parts by weight of benzylbutylphthalate;
45 parts by weight of dioctyl phthalate;

To this plastisol 1.5 percent by weight (based on the PVC) of the emulsifier mixture having a composition set forth below was added and mixed therewith: 47 percent by weight of the calcium salt of dodecylbenzenesulfonic acid, 50 percent by weight of coconut oil alcohol, etherified with 12 moles of ethylene oxide, 3 percent by weight of water.

The foaming of this plastisol was conducted by means of a "Euromatic" mixer under the usual conditions. The density of the non-gelled foam was 0.55 g./cm.³, and that of the gelled foam was 0.50 g./cm.³.

Example 8

With the use of a planet mixer, a plastisol was produced in the usual manner from 40 parts by weight of "Mesamoll" (a commercial plasticizer comprising a pentadecylsulfonic acid ester mixture of phenol and cresol of Farbenfabriken Bayer) and 60 parts by weight of a polyvinylchloride resin having a K value of 70.

To 300 g. of such a paste was added 2.0 percent by weight (based on polyvinylchloride) of the emulsifier mixture having a composition set forth below 60 percent by weight of the calcium salt of dodecylbenzene sulfonic acid
37 percent by weight of tetradecanol alcohol, etherified with 10 moles of ethylene oxide, 3 percent by weight of water the foaming process was carried out by agitation with an "AEG" kitchen eggbeater (10 minutes). After the absorption of air was terminated, a density of the non-gelled foam of 0.51 g./cm.³ was reached.

A sample of the foam was spread with a manual doctor blade to a thickness of 3 mm. on PVC paper and gelled at 170° C. for 2 minutes in a laboratory-type circulation air chamber manufactured by the firm Heraeus. After gelling, the density of the foam was 0.45 g./cm.³.

We claim:

1. In a process for making a plasticized vinyl resin open-cell sponge which comprises mechanically frothing a plastisol comprising 100 parts by weight of a particulate thermoplastic vinyl resin selected from the group consisting of polyvinylchloride and copolymers of vinylchloride, and from 50–400 parts of high boiling organic liquid plasticizer for the resin and thereby incorporating a surrounding gas into the mixture, subsequently heating the resulting froth at a temperature and for a time sufficient to fuse the resin particles with the plasticizer while maintaining the froth structure, and cooling the resulting material to room temperature, the improvement comprising adding about 0.5 to 2.5 percent by weight based on the vinyl resin of an emulsifier mixture to the plastisol during the mechanical frothing, said emulsifier mixture consisting essentially of:
   (a) about 30–80 percent by weight of the calcium salt of n-dodecylbenzenesulfonic acid; and
   (b) about 70–20 percent by weight of a compound having the general formula $$R-O-(CH_2-CH_2-O)_nH$$

wherein R represents an unbranched alkyl group having 8–20 carbon atoms, and $n$ represents integers from 6–16.

2. The process of claim 1 wherein said emulsifier mixture comprises:
   (a) about 55–65 percent by weight of the calcium salt of n-dodecylbenzenesulfonic acid; and
   (b) about 45–35 percent by weight of a compound having the general formula $$R-O-(CH_2-CH-O)_nH$$

wherein R represents an unbranched alkyl group having 12–18 carbon atoms and $n$ represents integers from 10 to 12.

3. The process of claim 1, wherein said copolymers comprise not more than 10 percent by weight of a comonomer in addition to vinylchloride.

4. The process of claim 3, wherein said comonomer is vinylacetate.

5. The gelled open-cell sponge obtained by the process of claim 1, having a density of about 0.6 to 0.45 grams per cubic centimeter.

References Cited
UNITED STATES PATENTS

| | | | |
|---|---|---|---|
| 2,861,963 | 11/1958 | Butsch | 260—2.5 P |
| 3,067,151 | 12/1962 | Terry et al. | 260—2.5 P |

MURRAY TILLMAN, Primary Examiner

M. FOELAK, Assistant Examiner

U.S. Cl. X.R.

260—2.5 L, 29.6 MQ, 29.6 ME, 30.6 R, 30.8 R, 31.8 R, 33.4 R, 41 R, 45.75 R, 45.75 K, 891